(12) United States Patent
Dagtas et al.

(10) Patent No.: US 6,859,803 B2
(45) Date of Patent: Feb. 22, 2005

(54) APPARATUS AND METHOD FOR PROGRAM SELECTION UTILIZING EXCLUSIVE AND INCLUSIVE METADATA SEARCHES

(75) Inventors: Serhan Dagtas, Croton on Hudson, NY (US); Radu S. Jasinschi, Ossining, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 565 days.

(21) Appl. No.: 10/014,178

(22) Filed: Nov. 13, 2001

(65) Prior Publication Data

US 2003/0093260 A1 May 15, 2003

(51) Int. Cl.[7] .............................................. G06F 17/30
(52) U.S. Cl. ...................... 707/5; 707/2; 707/3; 707/4; 707/6
(58) Field of Search .................... 707/1–10, 100–104.1; 709/217–219

(56) References Cited

U.S. PATENT DOCUMENTS

| | | | |
|---|---|---|---|
| 5,151,857 A | | 9/1992 | Matsui ........................... 704/9 |
| 5,223,924 A | | 6/1993 | Strubbe ........................ 725/46 |
| 5,383,120 A | * | 1/1995 | Zernik .......................... 704/10 |
| 5,717,913 A | | 2/1998 | Driscoll .......................... 707/5 |
| 6,005,565 A | * | 12/1999 | Legall et al. ................ 345/721 |
| 6,005,631 A | | 12/1999 | Anderson et al. ............. 725/53 |
| 6,078,925 A | * | 6/2000 | Anderson et al. ....... 707/103 R |
| 6,181,336 B1 | * | 1/2001 | Chiu et al. ................... 345/736 |
| 6,268,849 B1 | * | 7/2001 | Boyer et al. .................. 725/40 |
| 6,311,194 B1 | * | 10/2001 | Sheth et al. ................. 715/505 |
| 6,374,260 B1 | * | 4/2002 | Hoffert et al. ........... 707/104.1 |
| 6,480,835 B1 | * | 11/2002 | Light ............................. 707/3 |
| 6,546,388 B1 | * | 4/2003 | Edlund et al. .................. 707/5 |
| 6,609,123 B1 | * | 8/2003 | Cazemier et al. ............... 707/4 |
| 6,640,228 B1 | * | 10/2003 | Handerson et al. ............. 707/6 |
| 6,643,652 B2 | * | 11/2003 | Helgeson et al. ............. 707/10 |
| 2002/0069218 A1 | * | 6/2002 | Sull et al. ................. 707/501.1 |
| 2002/0099695 A1 | * | 7/2002 | Abajian et al. ................. 707/3 |
| 2003/0229529 A1 | * | 12/2003 | Mui et al. ....................... 705/8 |

FOREIGN PATENT DOCUMENTS

| | | |
|---|---|---|
| WO | 9821878 A3 | 5/1998 |
| WO | 9826584 A1 | 6/1998 |
| WO | 0180070 A2 | 10/2001 |

OTHER PUBLICATIONS

PHA 23, 361, U.S. Appl. No. 09/006,657, filed Jan. 13, 1998, now USP 6363380.
Data Retrieval using Conceptual Fuzzy Sets, by T. Takagi et al., pp. 94–99, 2000, IEEE.
"Conceptual Matching and its Applications to Selection of TV Programs and BGMs", by T. Takagi, pp. 269–273, 1999 IEEE.

* cited by examiner

Primary Examiner—Greta Robinson
Assistant Examiner—Linh Black
(74) Attorney, Agent, or Firm—Laurie Gathman (57) ABSTRACT

An apparatus and method for conducting exclusive and inclusive metadata searches to identify and select multimedia programs. The apparatus of the invention including a metadata search controller that compares user specified search words with metadata words to find programs that meet user specified search criteria. The metadata search controller executes an inclusive metadata search to search for matches between a user specified search word and a metadata word that is related to the user specified search word in a word pair contained within a word pair database. The metadata search controller calculates a rank value for each program that is found by a metadata search and creates a ranked list of such programs.

66 Claims, 4 Drawing Sheets

APPARATUS AND METHOD FOR PROGRAM SELECTION UTILIZING EXCLUSIVE AND INCLUSIVE METADATA SEARCHES

TECHNICAL FIELD OF THE INVENTION

The present invention is directed, in general, to identifying and selecting multimedia programs that contain user specified search words and, more specifically, to an apparatus and method for conducting exclusive and inclusive metadata searches to identify and select such multimedia programs.

BACKGROUND OF THE INVENTION

A wide variety of video recorders are available in the marketplace. Most people own, or are familiar with, a video cassette recorder (VCR), also referred to as a video tape recorder (VTR). A video cassette recorder records video programs on magnetic cassette tapes. More recently, video recorders have appeared in the market that use computer magnetic hard disks rather than magnetic cassette tapes to store video programs. For example, the ReplayTV™ recorder and the TiVO™ recorder digitally record television programs on hard disk drives using, for example, an MPEG video compression standard. Additionally, some video recorders may record on a readable/writable, digital versatile disk (DVD) rather than a magnetic disk.

The widespread use of video recorders has generated and continues to generate large volumes of videotaped materials. Because a video recorder captures both video signals and audio signals, videotaped materials are multimedia materials. A number of different types of automatic computerized systems and methods have been developed for analyzing, identifying, and selecting multimedia materials.

The automatic computerized systems and methods that exist for analyzing multimedia materials are generally capable of identifying segments of a video program that contain topics identified by a user. The desired segments are usually identified based upon search words that the user provides to the system.

An automatic computerized multimedia retrieval system that allows users to identify and select portions of multimedia materials usually meets three requirements. First, a system and method is usually available for parsing a video signal into its video, audio, and text components. Second, a system and method is usually available for analyzing the content of the video, audio, and text components of the multimedia signal with respect to user input criteria and segmenting the components based on content. Third, a system and method is usually available for integrating and storing program segments that match the user's search criteria.

A system that meets these requirements is described in U.S. Pat. No. 6/363,380 filed Jan. 13, 1998 by Dimitrova et al. entitled "Multimedia Computer System with Story Segmentation Capability and Operating Program Therefor Including Finite Automaton Video Parser." U.S. patent application Ser. No. 09/006,657 now U.S. Pat. No. 6,363,380 is hereby incorporated herein by reference within this document for all purposes as if fully set forth herein.

U.S. patent application Ser. No. 09/006,657 now U.S. Pat. No. 6,363,380 describes a system and method that provides a set of models for recognizing a sequence of symbols, a matching model that identifies desired selection criteria, and a methodology for selecting and retrieving one or more video story segments or sequences based upon the selection criteria.

Another system that meets these requirements is described in U.S. patent application Ser. No. 09/442,960 filed Nov. 18, 1999 by Dimitrova et al. entitled "Method and Apparatus for Audio/Data/Visual Information Selection." U.S. patent application Ser. No. 09/442,960 is hereby incorporated herein by reference within this document for all purposes as if fully set forth herein.

"Metadata" is information that identifies certain features of the multimedia programs that are transmitted in a multimedia signal. For example, a television signal may also transmit an Electronic Program Guide (EPG) that contains metadata information concerning the television programs transmitted in the television signal. The EPG metadata may include the title of a program, the time the program is to be transmitted, an identification of the type of program, the names of persons who appear in the program, the parental guidance rating of the program, and other similar types of information.

Prior art systems exist that are capable of conducting program searches on metadata text information. One type of prior art system is disclosed in U.S. Pat. No. 6,005,565 issued to Legall et al. on Dec. 21, 1999 entitled "Integrated Search of Electronic Program Guide, Internet and Other Information Resources." Another type of prior art system is disclosed in U.S. Pat. No. 6,005,631 issued to Anderson et al. on Dec. 21, 1999 entitled "Methods and Apparatus for Organizing and Searching An Electronic Program Guide."

Prior art systems generally compare user selected search words with words contained within the metadata information. This type of search requires an identical match of a search word with a series of symbols (known as a "string") within the metadata text.

The search results of prior art metadata search systems generally comprise a list of search result programs. A search result program is one in which a match was found between a search word and a metadata word. The search result list of programs may contain so many programs that it is not feasible to view or to record all of the programs. The "exact match" criterion of prior art metadata search systems does not allow sufficient flexibility for a search to be conducted that recognizes a word that does not exactly match a search word.

There is therefore a need for an improved apparatus and method for conducting metadata searches to identify and select multimedia programs using more flexible user selection criteria.

SUMMARY OF THE INVENTION

It is an object of the present invention to provide an apparatus and method for conducting metadata searches to identify and select multimedia programs.

In one advantageous embodiment, the apparatus of the present invention comprises a metadata search controller that is capable of receiving metadata from video signals, audio signals, and text signals of multimedia programs. The metadata search controller compares user specified search words with metadata words to find programs that meet the user specified search criteria. The metadata search controller is capable of executing an exclusive metadata search to search for exact matches between a user specified search word and a metadata word. The metadata search controller is also capable of executing an inclusive metadata search to also search for matches between a user specified search word and a metadata word that is related to the user specified search word in a word pair contained within a word pair database.

The metadata search controller is also capable of calculating a rank value for each program that is found by a metadata search and creating a ranked list of such programs. The metadata search controller is also capable of using the rank values of the programs to automatically update the priority of programs to be recorded by a multimedia recorder. The metadata search controller is also capable of using the rank values of the programs to automatically select programs to be deleted from a multimedia recorder.

It is an object of the present invention to provide an apparatus and method for conducting exclusive metadata searches and for conducting inclusive metadata searches to identify and select multimedia programs.

It is an additional object of the present invention to provide an apparatus and method for using a word pair database to conduct an inclusive metadata search that is capable of finding words that do not exactly match a user specified search word but are related to the user specified search word.

It is also an object of the present invention to provide an apparatus and method for creating a metadata search results list of multimedia programs that meet user selection criteria.

It is another object of the present invention to provide an apparatus and method for calculating rank values for each program found by a metadata search.

It is still another object of the present invention to provide an apparatus and method for using calculated rank values to automatically update the priority of programs to be recorded by a multimedia recorder.

It is another object of the present invention to provide an apparatus and method for using calculated rank values to automatically select programs to be deleted from a multimedia recorder.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/ output devices and memory, that execute one or more application programs and/or an operating system program. Definitions for certain words and phrases are provided throughout this patent document. Those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a multimedia processor. Those skilled in the art will recognize that the exemplary embodiment of the present invention may easily be modified for use in other types of systems for analyzing multimedia signals.

Figure 1:
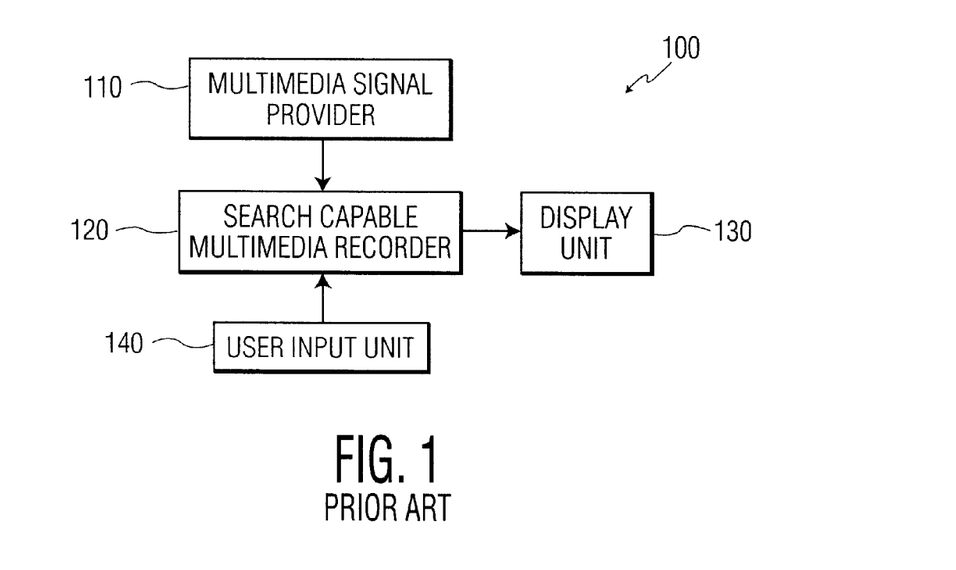
FIG. 1 illustrates a block diagram of an exemplary prior art multimedia system comprising a multimedia signal provider, a search capable multimedia recorder, a display unit, and a user input unit.

FIG. 1 illustrates a block diagram of an exemplary prior art multimedia system 100 comprising a multimedia signal provider 110, a search capable multimedia recorder 120, a display unit 130, and a user input unit 140. Multimedia signal provider 110 comprises a source of multimedia signals. For example, multimedia signal provider 110 may comprise a source of cable television signals, a source of satellite television signals, a source of videotaped multimedia signals, an Internet connection, or other similar sources of multimedia signals.

Search capable multimedia recorder 120 receives multimedia signals from multimedia signal provider 110. Search capable multimedia recorder 120 may comprise a video recorder with a hard disk drive memory, a television set with a video recorder with a hard disk drive memory, a set top box with a video recorder with a hard disk drive memory, a personal computer with a video card, a Web enabled set top box, an Internet appliance that is capable of receiving multimedia signals from the Internet, or other similar types of electronic equipment.

Display unit 130 receives and displays output multimedia signals from search capable multimedia recorder 120. Display unit 130 may comprise a computer monitor, a television screen, a cathode ray tube, a flat panel display, or any type of equipment for displaying video images. Using user input unit 140, a user may send search request information (e.g., user specified search words) to search capable multimedia recorder 120. User input unit 140 may comprise a keyboard, a mouse, a remote control unit, a floppy disk unit, a compact disk unit, or other similar types of input devices. User input may also be received from a remote location through an Internet interface or through a mobile telephone.

Figure 2:
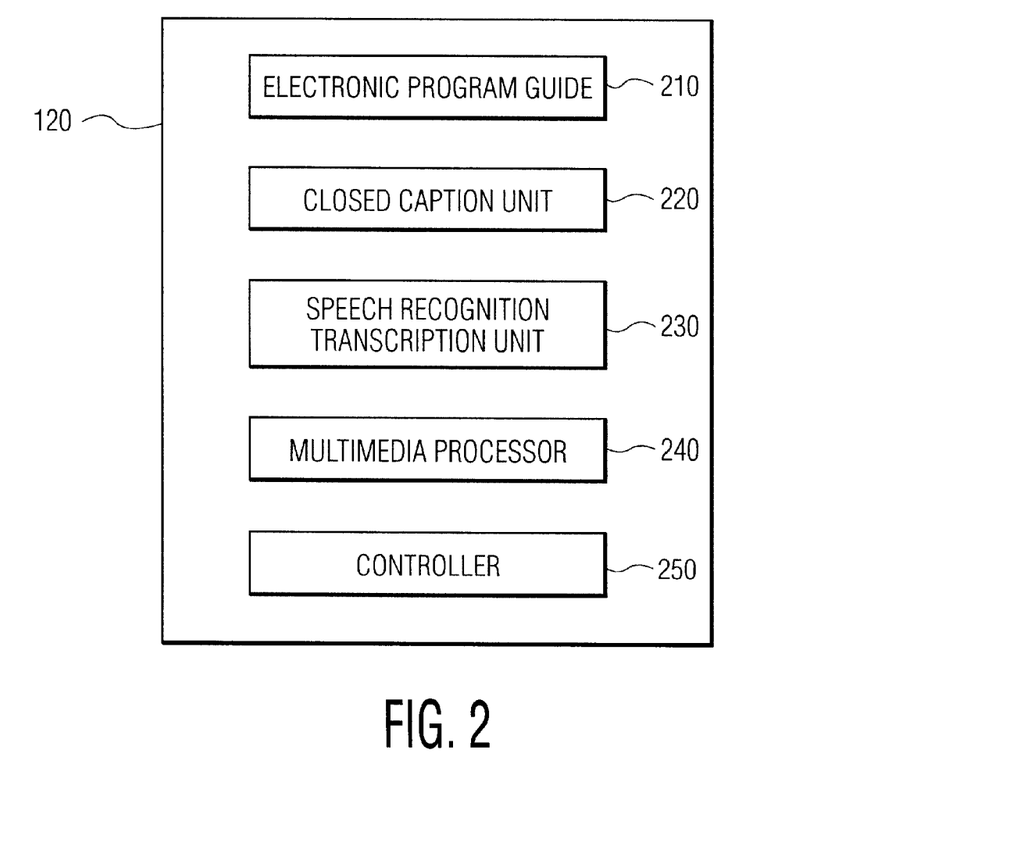
FIG. 2 illustrates a block diagram of an exemplary search capable multimedia recorder comprising an electronic program guide, a closed caption unit, a speech recognition transcription unit, a multimedia processor, and a controller that embodies the apparatus and method of the present invention.

FIG. 2 illustrates a block diagram of an exemplary search capable multimedia recorder 120. Search capable multimedia recorder 120 comprises an Electronic Program Guide 210, a closed caption unit 220, a speech recognition transcription unit 230, a multimedia processor 240, and a controller 250 that embodies the apparatus and method of the present invention.

In addition to sending multimedia programs to search capable multimedia recorder 120, multimedia signal provider 110 also sends "metadata." Metadata is information that identifies certain features of the multimedia programs received from multimedia signal provider 110. For example, multimedia signal provider 110 sends Electronic Program Guide (EPG) information to search capable multimedia recorder 120. EPG 210 contains metadata information for the television programs that are available from multimedia signal provider 110. EPG 210 may contain the title of a program, the channel of the program, the time the program is to be transmitted, an identification of the type of program, the names of persons who appear in the program, the parental guidance rating of the program, and other similar types of information. EPG 210 is a major source of metadata information for search capable multimedia recorder 120.

In addition to sending multimedia programs to search capable multimedia recorder 120, multimedia signal provider 110 also sends closed caption text. Closed caption text comprises a textual transcript of a multimedia program. Closed caption text is also a major source of metadata. Search capable multimedia recorder 120 comprises closed caption text unit 220 for receiving and analyzing closed caption text.

Search capable multimedia recorder 120 also comprises speech recognition transcription unit 230. In some cases closed caption text is not available. Therefore, a transcript of the audio portions of the multimedia program (e.g., speech) must be obtained using speech-to-text conversion techniques. The audio information is passed through a speech recognition process. The output of the speech recognition process is then fed to a speech-to-text conversion process. Speech recognition transcription unit 230 analyzes audio portions of a multimedia program and produces a textual transcript of the program. The text provided by speech recognition transcription unit 230 is also a source of metadata.

Multimedia processor 240 and controller 250 are capable of receiving metadata information that is generated by Electronic Program Guide 210, closed caption unit 220, and speech transcription unit 230.

Figure 3:
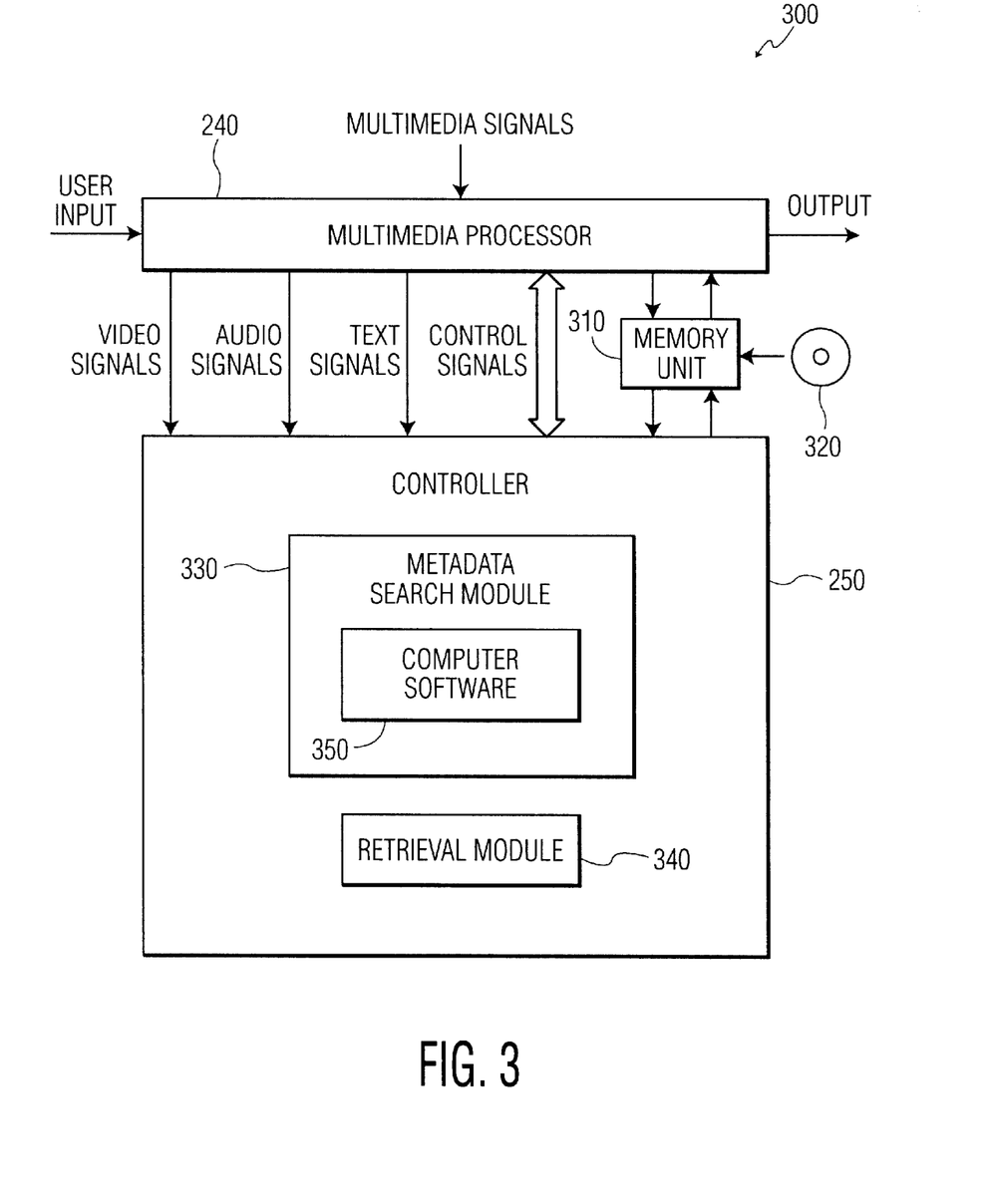
FIG. 3 illustrates a block diagram of an exemplary multimedia analysis system showing an interconnection of a multimedia processor and an advantageous embodiment of a controller of the present invention.

FIG. 3 illustrates a block diagram of an exemplary multimedia analysis system 300 for analyzing multimedia signals. Multimedia analysis system 300 comprises multimedia processor 240. Multimedia processor 240 receives multimedia signals and parses them into video, audio, and text components. Multimedia processor 240 analyzes the content of the video, audio, text components of the multimedia signal and identifies and segments the components based on content. Multimedia processor 240 stores the signal components and signal segments in memory unit 310. In one advantageous embodiment, multimedia processor 240 may comprise the multimedia processor described in U.S. patent application Ser. No. 09/006,657 now U.S. Pat. No. 6,363,380. In another advantageous embodiment, multimedia processor 240 may comprise the multimedia processor described in U.S. patent application Ser. No. 09/442,960.

Memory unit 310 may comprise random access memory (RAM) or a combination of random access memory (RAM) and read only memory (ROM). Memory unit 310 may comprise a non-volatile random access memory (RAM), such as flash memory. Memory unit 310 may comprise a mass storage data device, such as a hard disk drive (not shown) Memory unit 310 may also comprise an attached peripheral drive or removable disk drive (whether embedded or attached) that reads read/write DVDs or re-writable CD-ROMs. As illustrated in FIG. 3, removable disk drives of this type are capable of receiving and reading re-writable CD-ROM disk 320.

Multimedia processor 240 provides the video signals, audio signals, and text signals that are the components of a multimedia program to controller 250 of the present invention. Controller 250 is capable of receiving control signals from multimedia processor 240 and sending control signals to multimedia processor 240. Controller 250 is also coupled to multimedia processor 240 through memory unit 310.

A user may conduct a search by sending search words to controller 250 through user input unit 140 and multimedia processor 240. As will be more fully described, controller 250 is capable of creating a metadata search result list from metadata obtained from video signals, audio signals, and text signals received from multimedia processor 240. A metadata search result list generally comprises a ranked list of programs that contain words within their respective metadata that match user specified search words.

Controller 250 stores the metadata search result list in memory unit 310. Multimedia processor 240 is capable of accessing the metadata search result list stored in memory unit 310 and sending instructions to the search capable multimedia recorder 120 to record the programs on the metadata search result list.

As shown in FIG. 3, controller 250 comprises metadata search module 330 and retrieval module 340. Metadata search module 330 comprises computer software 350. Metadata search module 330 compares search words specified by a user with words contained within the metadata. Metadata search module 330 identifies matches of the user specified search words with metadata words. Metadata search module 330 generates a metadata search result list that lists the programs that contain user specified search words that match metadata words.

In response to a user request received through user input unit 140 and multimedia processor 240, retrieval module 340 accesses the metadata search result list stored in memory unit 310. Retrieval module 340 then sends the metadata search result list to display unit 130 for display to the user.

Figure 4:
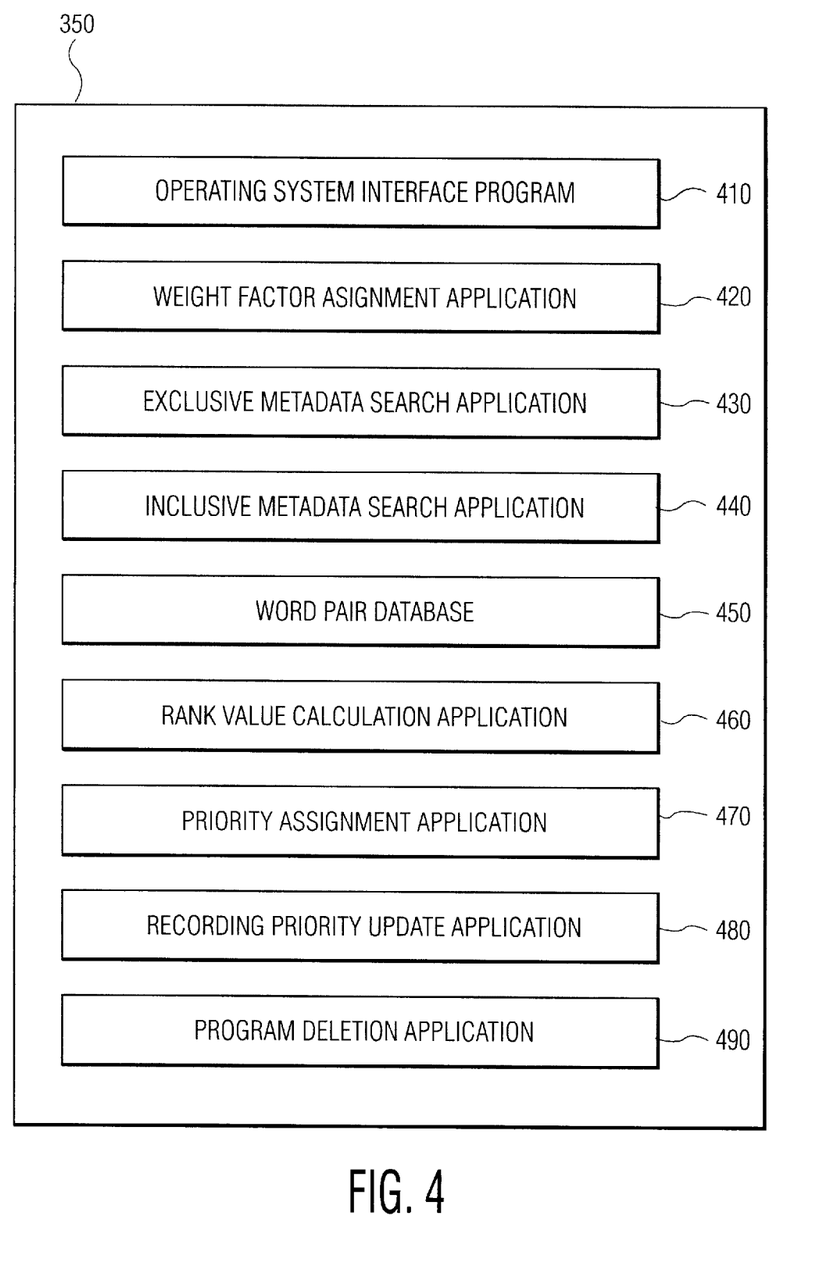
FIG. 4 illustrates computer software that may be used with one advantageous embodiment of the present invention.

Controller 250 must identify the user specified search words within the metadata in order to create a metadata search result list. An advantageous embodiment of the present invention comprises computer software 350 capable of identifying the user specified search words within the metadata. FIG. 4 illustrates a selected portion of computer software 350 of the present invention. Computer software 350 may be contained within metadata search module 330 or within memory unit 310.

Computer software 350 comprises operating system interface program 410, weight factor assignment application 420, exclusive metadata search application 430, inclusive metadata search application 440, word pair database 450, rank value calculation application 460, priority assignment application 470, and recording priority update application 480. Controller 250 and computer software 350 together comprise a metadata search controller that is capable of carrying out the present invention.

Operating system interface program 410 coordinates the operation of computer software 350 with the operating system of controller 250. Under the direction of instructions in computer software 350 stored within metadata search module 330 (or within memory unit 310), controller 250 compares the user specified search words with words contained within the metadata.

To illustrate the operation of controller 250 and software 350, assume that a user is looking for a program that has the word "rain" in the title of the program. Then the word "rain" will be a user specified search word for a title search field. The search word "rain" is input to controller 250 through user input unit 140 and multimedia processor 240. Controller 250 places the user specified search word "rain" into a title search field.

Controller 250 then continues to receive other user specified search words and place them into appropriate search fields. For example, the user may enter the letters "PG-13" for the desired parental guidance rating of a program ("rating" search field). The user may enter the name "Tom Hanks" as the name of an actor who appears in the desired program ("actor" search field).

As the user enters each additional search field, the user specifies a logical connection to an existing search field in the search request (or to an existing combination of search fields in the search request) by specifying a logical operator AND, or a logical operator OR, or a logical operator NOT, or a logical operator comprising a combination of the logical operators AND, OR, and NOT. That is, as each search field is added to an existing user search request the user specifies whether the specified entry in the additional search field is to be required (using the AND operator) or optional (using the OR operator), or excluded (using the NOT operator), or related in some other manner (using a logical operator comprising a combination of the logical operators AND, OR, and NOT). In this manner the user may build a search request that searches for an exact combination of search fields desired by the user.

For example, the user may build a search request for a program in which the word "rain" is in the title, OR in which "Tom Hanks" is an actor in the program, AND in which the program rating is NOT "R" (restricted).

Controller 250 then executes weight factor assignment application 420 to assign a search field weight factor to each of the search fields. The search field weight factor is a number that reflects the relative importance of a particular search field. If a particular search field is very important, then it will be assigned a number that represents a large search field weight factor. The scale of search field weight factors may be selected as desired. For example, in one embodiment the scale of search field weight factors may run from zero (0) for the lowest importance to one (1) for the highest importance.

In one advantageous embodiment of the present invention, controller 250 receives the search field weight factors directly from the user. Controller 250 generates and sends a message to the user through multimedia processor 240 and display unit 130 asking the user to input a desired search field weight factor for each search field. Controller 250 then receives the search field weight factors selected by the user through user input unit 140 and multimedia processor 240.

In an alternate embodiment of the present invention, controller 250 automatically generates the search field weight factors from stored information concerning the viewing habits of the user. The viewing habits information may be previously collected and stored within controller 250 or within memory unit 310.

After controller 250 has assigned the search field weight factors, then controller 250 determines whether the metadata search is to be an "exclusive" search or an "inclusive" search. An exclusive metadata search is a search that only recognizes an exact match between a user specified search word and a metadata word. An inclusive metadata search is a search that recognizes not only an exact match between a user specified search word and a metadata word but also a match between a user specified search word and a metadata word that is related to the user specified search word.

Consider the example mentioned above that has the search word "rain" in a title search field. An exclusive metadata search would find only those programs with titles that contain the word "rain." As will be more fully described, an inclusive metadata search would find not only programs with titles that contain the word "rain" but also programs with titles that contain related words such as "storm" and "thunderstorm" and "downpour" and other similar words.

An on-line thesaurus can be used to locate related words. The on-line thesaurus may comprise an aggregation of individual thesauri. An excellent example is The Web Thesaurus Compendium (http://www.darmstadt.gmd.de/~lutes/thesoecd.html) that comprises thesauri that are comprehensive for different subjects. For example, in order to access and retrieve geographic terms, the system can use the Getty Thesaurus of Geographic Names (http://www.getty.edu/research/tools/vocabulary/tgn/index.html).

In addition, a lexical reference system such as WordNet can be used. WordNet is an on-line lexical database inspired by the theory of lexical memory. WordNet consists of English nouns, verbs, adjectives and adverbs organized into synonym sets, each representing an underlying lexical concept. For additional information refer to "WordNet: An Electronic Lexical Database" edited by Christiane Fellbaum, Bradford Books, 1998. These types of reference systems do not describe the degree of relatedness between individual words.

In one advantageous embodiment of the present invention, controller 250 receives an instruction directly from the user to conduct either an exclusive search or an inclusive search. Controller 250 generates and sends a message to the user through multimedia processor 240 and display unit 130 asking the user to specify the type of search to be conducted. Controller 250 then receives a user instruction specifying the type of search to be conducted through user input unit 140 and multimedia processor 240.

In an alternate embodiment of the present invention, controller 250 automatically selects the exclusive search mode as a default search type. That is, controller 250 will always conduct exclusive searches until ordered by the user to conduct an inclusive search.

For an exclusive search, controller 250 executes exclusive metadata search application 430. Exclusive metadata search application 430 selects programs in which an exact match is found between a user specified search word and a metadata word. Exclusive metadata search application 430 creates a list of programs that meet the search criteria.

For an inclusive search, controller 250 executes inclusive metadata search application 440. Inclusive metadata search application 440 consults a word pair database 450 that contains a plurality of sets of word pairs. Each word pair in word pair database 450 has an assigned word pair weight factor. The word pair weight factor is a number that reflects the relative significance or importance of a particular word pair. If a particular word pair combination is very significant, then it will be assigned a number that represents a large word pair weight factor. The scale of word pair weight factors may be selected as desired. For example, in one embodiment the scale of word pair weight factors may run from zero (0) for the lowest importance to one (1) for the highest importance.

As previously mentioned, an inclusive metadata search for the search word "rain" in a title search field will also find programs with titles that contain related words such as "storm" and "thunderstorm" and "downpour" and other similar words. The word pair weight factor for the word pair "rain and storm" or for the word pair "rain and thunderstorm" may have a high value such as eight tenths (0.8). The word pair weight factor for the word pair "rain and cloud" may have a lower value such as six tenths (0.6). The word pair weight factor for the word pair "rain and water" may have an even lower value such as four tenths (0.4). These values represent an example of a word pair weight factor scale from zero (0) to one (1). Other types of word pair weight factor scales may also be used.

Inclusive metadata search application 440 selects programs in which a related "word pair" match is found between a search word and a metadata word. Inclusive metadata search application 440 creates a list of programs that meet the search criteria.

Controller 250 then calculates a rank value for each program that meets the metadata search criteria. A rank value is a number that represents a measure of the overall relevance of a program with respect to the metadata search criteria. Controller 250 executes rank value calculation application 460 to compute the program rank values.

For exclusive metadata searches, rank value calculation application 460 calculates rank values using (1) the search field weight factor for each search field, and (2) the number of matches of words found during the exclusive metadata search. For inclusive metadata searches, rank value calculation application 460 calculates rank values using (1) the search field weight factor for each search field, and (2) the word pair weight factors for each word pair detected during the inclusive metadata search, and (3) the number of matches of words found during the inclusive metadata search.

The calculation of rank values may be accomplished using a variety of different mathematical techniques. For example, in an exclusive metadata search, the rank value for a program may equal a sum of terms where each term equals the product of a search field weight factor times the number of matches of words found for the search field. In an inclusive metadata search, the rank value for a program may have an additional factor equal to a sum of terms where each term equals the product of a word pair weight factor times the number of matches of words found for the word pair.

For example, the rank value for a program may be calculated from the equation:

$$Rank = \sum_{i=1}^{N} w_i \sum_{j=1}^{M} r_j \tag{1}$$

where N is the total number of words in a search field, and $w_i$ is a search field weight factor for field "i", and M is the total number of words within a field, and $r_j$ is a matching factor for the "$j^{th}$" word in a particular field. If the match is exact, then the value of $r_j$ is equal to one (1). If the related word has a matching factor then the matching factor of the related word is included. The matching factor number should be normalized to be a value between zero (0) and one (1). Other types of rank calculation methods may also be devised.

Controller 250 then executes priority assignment application 470 to create a search result list of the programs that were found during either an exclusive metadata search or an inclusive metadata search. Priority assignment application 470 lists the programs in accordance with their respective rank values calculated by rank value calculation application 460. As previously mentioned, controller 250 can transmit a copy of the ranked list of programs to display 130 in response to a user request.

If the number of programs located during a search exceeds a predetermined program limit number (e.g., fifty (50) programs or one hundred (100) programs), then controller 250 suspends the search and sends a message to display 130 to notify the user that the program limit number for the search result list has been reached. The user can then give an instruction to cause controller 250 to display the search result list of programs on display 130. The user then reviews the programs in the search result list to determine which programs are undesirable. A program may be undesirable either because it is not relevant or because the user has already viewed or recorded the program. The user then sends instructions to controller 250 to delete the undesirable programs from the search result list. The user may also send an instruction to controller 250 to cause controller 250 to resume the suspended search program after the undesirable programs have been deleted. Alternatively, the user may send an instruction to controller 250 to cause controller 250 to terminate the search at that point.

The user may view the search result list at any time by sending an instruction to controller 250 to display the search result list on display 130. The user may also delete undesirable programs from the search result list at any time. It is not necessary for the number of programs located to reach the program limit number in order for the user to be able to delete undesirable programs from the search result list.

Controller 250 executes recording priority update application 480 to automatically update the priorities of programs to be recorded by search capable multimedia recorder 120. Recording priority update application 480 utilizes the rank values for the programs to update the recording priority for each program to be recorded.

In prior art recording devices, a list of programs to be recorded (the "program list") is maintained. The oldest programs in the program list are usually deleted when newly added program selections cause the program list to exceed its capacity. The new programs are added to the program list and a sufficient number of older programs are deleted from the program list to make room for the new programs. Prior art recording devices delete an older program from the program list based only on the time elapsed since the older program was placed on the program list. This elapsed time is may be referred to as the "age" of a program.

Using the principles of the present invention, a user can specifically assign higher values to the weight factors (either the search field weight factors, or the word pair weight factors, or both) in order to increase the priority of older programs that the user wishes to retain on the program list. A newly added program may not necessarily have a higher priority than an older program. Recording priority update application 480 continually updates the priorities of the programs on the program list in accordance with the rank values of the programs obtained from metadata searches.

Controller 250 also executes program deletion application 490 to delete programs from the program list of programs to be recorded by search capable multimedia recorder 120. Program deletion application 490 utilizes the rank values for the programs to determine which program or programs should be deleted from the program list. Unlike prior art recording devices that delete programs based solely on the "age" of the programs, controller 250 executes program deletion application 490 to calculate a value for a program deletion factor. The program deletion factor is based upon both the "age" of a program and the rank value of a program. The relative weight given to the "age" of the program and to the rank value of a program in calculating a value for the program deletion factor may be adjusted by selecting values for their respective coefficients.

For example, a program deletion factor (PDF) may be calculated for a program from the equation:

$$PDF = \frac{C1}{RV} + (C2*A) \qquad (2)$$

where RV is the rank value of the program and C1 is a coefficient of the reciprocal of the rank value, and where A is the "age" of the program and C2 is a coefficient of the "age" of the program. The value of the program deletion factor increases with time as the "age" of a program increases.

The program deletion factor is calculated using the reciprocal of the rank value RV because the reciprocal of the rank value RV is greater for less desired programs. This means that the value of a program deletion factor will be larger for a less desired program (i.e., a program that has a small rank value). A highly desired program with a large rank value RV will have a correspondingly lower program deletion factor because the program deletion factor is calculated using the reciprocal of the rank value RV.

A highly desired program with a large rank value RV will not be deleted as quickly as it would otherwise be if the deletion process were based solely on the "age" of the program (i.e., the time that the program has been on the program list). Conversely, a less desired program with a low rank value will be deleted more quickly even though its "age" may not be very old.

The relative weight given to the reciprocal of the rank value of the program in calculating the program deletion factor may be adjusted by selecting an appropriate value for the coefficient C1. The relative weight given to the "age" of the program in calculating the program deletion factor may be adjusted by selecting an appropriate value for the coefficient C2.

Controller 250 is also capable of executing program deletion application 490 to delete programs from the program list even after the programs have already been recorded by search capable multimedia recorder 120. When a program that has already been recorded is to be deleted, controller 250 sends a signal authorizing search capable multimedia recorder 120 to record some other program over the program to be deleted.

Figure 5:
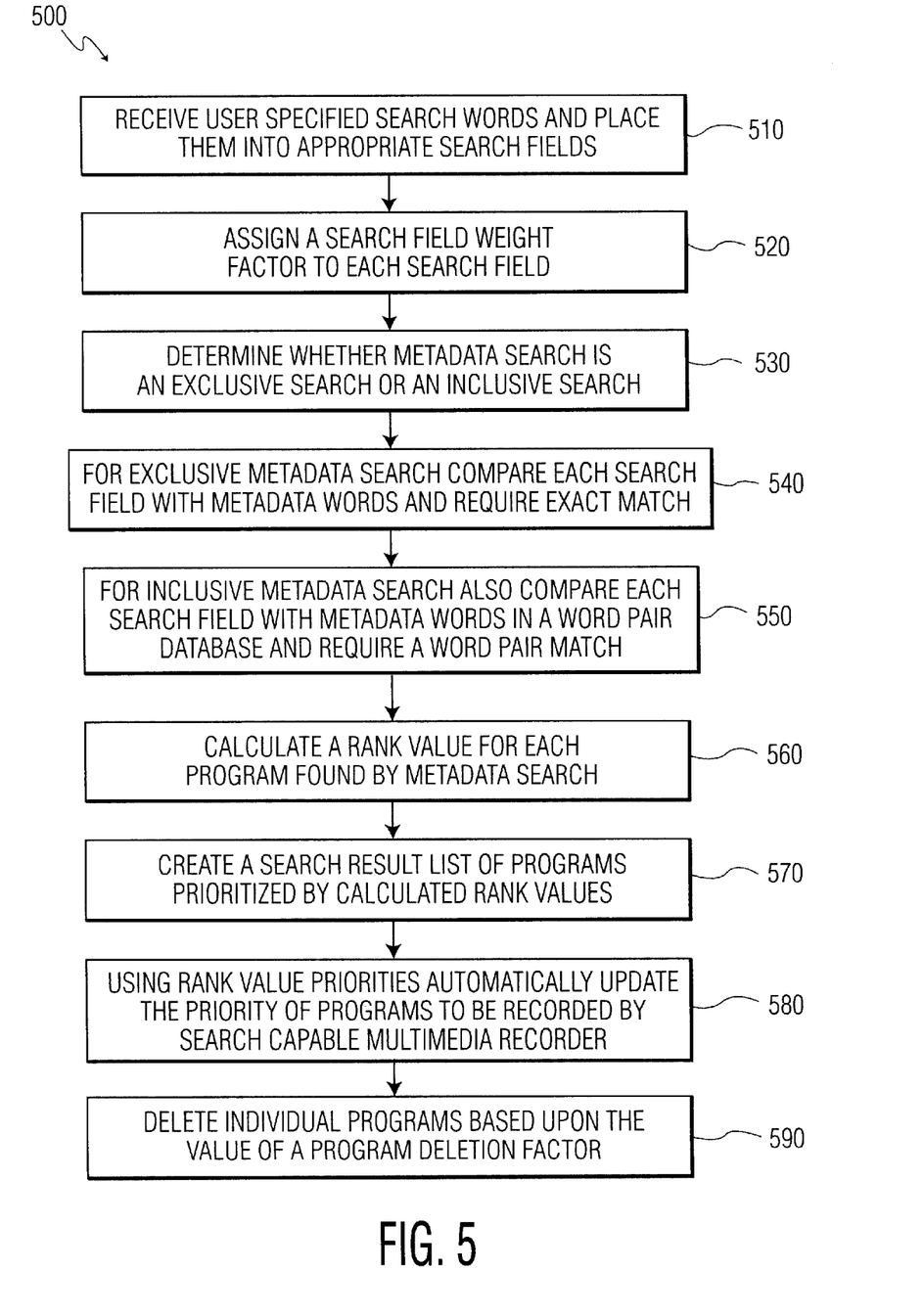
FIG. 5 illustrates a flow diagram showing an advantageous embodiment of a method of the present invention for conducting metadata searches to identify and select multimedia programs.

FIG. 5 illustrates a flow diagram showing an advantageous embodiment of the method of the present invention for conducting metadata searches to identify and select multimedia programs. The steps of the method are collectively referred to with the reference numeral 500. Controller 250 receives user specified search words from user input unit 140 and places the user specified search words into appropriate search fields (step 510). Controller 250 then assigns a search field weight factor to each search field (step 520). Controller 250 then determines whether the metadata search to be performed is an exclusive metadata search or an inclusive metadata search (step 530).

For an exclusive metadata search, controller 250 executes exclusive metadata search application 430 to search for exact matches between a user specified search word and a metadata word (step 540). For an inclusive metadata search, controller 250 executes inclusive metadata search application 440 to search for exact matches between a user specified search word and a metadata word, and for matches between a user specified search word and a metadata word that is related to the user specified search word in a word pair of a word pair database (step 550).

Controller 250 then executes rank value calculation application 460 to calculate a rank value for each program found by a metadata search (step 560). Controller 250 then executes priority assignment application 470 to create a search result list of the programs that were found during the metadata search in accordance with their respective rank values (step 570). Controller 250 executes recording priority update application 480 to automatically update the priorities of programs to be recorded by search capable multimedia recorder (step 580). Controller 250 then executes program deletion application 490 to delete individual programs based upon the value of a program deletion factor calculated using the reciprocal rank value and the "age" of the program (step 590).

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. An apparatus for identifying a multimedia program that contains at least one word that is related to a user specified search word, said apparatus comprising:

a metadata search controller capable of receiving metadata that contains words present in said multimedia program;

wherein said metadata search controller is capable of executing an inclusive metadata search that is capable of identifying a match between said user specified search word and a metadata word of said multimedia program that is related to said user specified search word.

2. The apparatus as claimed in claim 1 wherein said metadata search controller comprises:

a word pair database that contains a plurality of word pairs wherein each word pair in said word pair database comprises a first word and a second word; and a word pair weight factor assigned to each word pair in said word pair database, said word pair weight factor indicating a relative significance of a relationship between said first word and said second word of said word pair.

3. The apparatus as claimed in claim 2 wherein said metadata search controller is capable of executing an inclusive metadata search that is capable of identifying at least one word pair in said word pair database wherein one word of said word pair matches a metadata word of said multimedia program and wherein another word of said word pair matches said user specified search word.

4. The apparatus as claimed in claim 3 wherein said metadata search controller is capable of assigning a search field weight factor to each of a plurality of search fields in said inclusive metadata search wherein said search field weight factor is a number that reflects a relative importance of a search field.

5. The apparatus as claimed in claim 4 wherein said metadata search controller is capable of receiving a search field weight factor from one of: (1) a user instruction and (2) information concerning user viewing habits.

6. The apparatus as claimed in claim 3 wherein said metadata search controller is capable of assigning a word pair weight factor to at least one word pair in said word pair database.

7. The apparatus as claimed in claim 6 wherein said metadata search controller is capable of receiving a word pair weight factor from one of: (1) a user instruction and (2) information concerning user viewing habits.

8. The apparatus as claimed in claim 4 wherein said metadata search controller is capable of receiving an inclusive search request comprising a plurality of search fields where a relationship between a first search field and a second search field is expressed by one of: logical operator AND, logical operator OR, logical operator NOT, and a logical operator comprising a combination of said logical operators AND, OR, and NOT.

9. The apparatus as claimed in claim 1 wherein said metadata search controller is capable of executing an exclusive metadata search that is capable of identifying a match between said user specified search word and a metadata word of said multimedia program that exactly matches said user specified search word.

10. The apparatus as claimed in claim 9 wherein said metadata search controller is capable of receiving a user instruction to execute one of: an inclusive metadata search and an exclusive metadata search.

11. The apparatus as claimed in claim 9 wherein said metadata search controller is capable of receiving an exclusive search request comprising a plurality of search fields where a relationship between a first search field and a second search field is expressed by one of: logical operator AND, logical operator OR, logical operator NOT, and a logical operator comprising a combination of said logical operators AND, OR, and NOT.

12. The apparatus as claimed in claim 4 wherein said metadata search controller is capable of calculating a rank value for each multimedia program identified by said inclusive metadata search using:

a search field weight factor for each search field;

a word pair weight factor for each word pair detected during said inclusive metadata search; and a number of matches of words found during said inclusive metadata search.

13. The apparatus as claimed in claim 12 wherein said rank value for each multimedia program identified by said inclusive metadata search is calculated with the equation:

$$Rank = \sum_{i=1}^{N} w_i \sum_{j=1}^{M} r_j$$

where N is a total number of words in a search field, and where $w_i$ is a search field weight factor for field "i", and where M is a total number of words within a field, and where $r_j$ is a matching factor for a "j"$^{th}$ word in a particular field, and where if a match is exact, then a value of $r_j$ is equal to one (1).

14. The apparatus as claimed in claim 12 wherein said metadata search controller is capable of creating a search result list of multimedia programs identified during said inclusive metadata search where said multimedia programs are listed in accordance with their respective rank values.

15. The apparatus as claimed in claim 14 wherein said metadata search controller is capable of using a rank value of a multimedia program identified during said inclusive metadata search to automatically update a priority of a multimedia program that is to be recorded by a multimedia recorder.

16. The apparatus as claimed in claim 15 wherein said metadata search controller is capable of deleting a multimedia program from a program list based on a value of a program deletion factor calculated using a rank value of said multimedia program.

17. The apparatus as claimed in claim 16 wherein said program deletion factor (PDF) is calculated from the equation:

$$PDF = \frac{C1}{RV} + (C2 * A)$$

where RV is a rank value of said multimedia program and C1 is a coefficient of a reciprocal of said rank value, and where A is an age of the program, and where C2 is a coefficient of said age of said multimedia program.

18. The apparatus as claimed in claim 9 wherein said metadata search controller is capable of calculating a rank value for each multimedia program identified by said exclusive metadata search using:

a search field weight factor for each search field; and a number of matches of words found during said exclusive metadata search.

19. The apparatus as claimed in claim 18 wherein said metadata search controller is capable of creating a search result list of multimedia programs identified during said exclusive metadata search where said multimedia programs are listed in accordance with their respective rank values.

20. The apparatus as claimed in claim 19 wherein said metadata search controller is capable of using a rank value of a multimedia program identified during said exclusive metadata search to automatically update a priority of a multimedia program that is to be recorded by a multimedia recorder.

21. The apparatus as claimed in claim 20 wherein said metadata search controller is capable of deleting a multimedia program from a program list based on a value of a program deletion factor calculated using a rank value of said multimedia program.

22. The apparatus as claimed in claim 21 wherein said program deletion factor (PDF) is calculated from the equation:

$$PDF = \frac{C1}{RV} + (C2 * A)$$

where RV is a rank value of said multimedia program and C1 is a coefficient of a reciprocal of said rank value, and where A is an age of the program, and where C2 is a coefficient of said age of said multimedia program.

23. A method for identifying a multimedia program that contains at least one word that is related to a user specified search word, said method comprising the steps of:
   receiving in a metadata search controller metadata that contains words present in said multimedia program; and
   executing in said metadata search controller an inclusive metadata search; and
   identifying a match between said user specified search word and a metadata word of said multimedia program that is related to said user specified search word.

24. The method as claimed in claim 23 further comprising the steps of:
   creating a word pair database in said metadata search controller, said word pair database containing a plurality of word pairs wherein each word pair in said word pair database comprises a first word and a second word; and
   assigning a word pair weight factor to each word pair in said word pair database, said word pair weight factor indicating a relative significance of a relationship between said first word and said second word of said word pair.

25. The method as claimed in claim 24 further comprising the steps of:
   executing in said metadata search controller an inclusive metadata search; and
   identifying at least one word pair in said word pair database wherein one word of said word pair matches a metadata word of said multimedia program and wherein another word of said word pair matches said user specified search word.

26. The method as claimed in claim 25 further comprising the step of:
   assigning a search field weight factor to each of a plurality search fields in said inclusive metadata search wherein said search field weight factor is a number that reflects a relative importance of a search field.

27. The method as claimed in claim 26 further comprising the step of:
   receiving in said metadata search controller a search field weight factor from one of: (1) a user instruction and (2) information concerning user viewing habits.

28. The method as claimed in claim 25 further comprising the step of:
   assigning a word pair weight factor to at least one word pair in said word pair database using said metadata search controller.

29. The method as claimed in claim 28 further comprising the step of:
   receiving in said metadata search controller a word pair weight factor from one of: (1) a user instruction and (2) information concerning user viewing habits.

30. The method as claimed in claim 29 further comprising the steps of:
   receiving in said metadata search controller an inclusive search request comprising a plurality of search fields where a relationship between a first search field and a second search field is expressed by one of: logical operator AND, logical operator OR, logical operator NOT, and a logical operator comprising a combination of said logical operators AND, OR, and NOT.

31. The method as claimed in claim 23 further comprising the steps of:
   executing in said metadata search controller an exclusive metadata search; and
   identifying a match between said user specified search word and a metadata word of said multimedia program that exactly matches said user specified search word.

32. The method as claimed in claim 31 further comprising the step of:
   receiving a user instruction in said metadata search controller to execute one of: an inclusive metadata search and an exclusive metadata search.

33. The method as claimed in claim 31 further comprising the step of:
   receiving in said metadata search controller an exclusive search request comprising a plurality of search fields where a relationship between a first search field and a second search field is expressed by one of: logical operator AND, logical operator OR, logical operator NOT, and a logical operator derived from a combination of said logical operators AND, OR, and NOT.

34. The method as claimed in claim 26 further comprising the steps of:
   calculating a rank value for each multimedia program identified by said inclusive metadata search using:
   a search field weight factor for each search field;
   a word pair weight factor for each word pair detected during said inclusive metadata search; and
   a number of matches of words found during said inclusive metadata search.

35. The method as claimed in claim 34 further comprising the step of:
   calculating said rank value for each multimedia program identified by said inclusive metadata search with the equation:

$$Rank = \sum_{i=1}^{N} w_i \sum_{j=1}^{M} r_j$$

where N is a total number of words in a search field, and where $w_i$ is a search field weight factor for field "i", and where M is a total number of words within a field, and where $r_j$ is a matching factor for a "$j^{th}$" word in a particular field, and where if a match is exact, then a value of $r_j$ is equal to one (1).

36. The method as claimed in claim 34 further comprising the step of:
   creating a search result list of multimedia programs identified during said inclusive metadata search where said multimedia programs are listed in accordance with their respective rank values.

37. The method as claimed in claim 36 further comprising the step of:
   automatically updating a priority of a multimedia program that is to be recorded by a multimedia recorder using a rank value of a multimedia program identified during said inclusive metadata search.

38. The method as claimed in claim 37 further comprising the step of:

using said metadata search controller to delete a multimedia program from a program list based on a value of a program deletion factor calculated using a rank value of said multimedia program.

39. The method as claimed in claim 38 wherein said program deletion factor (PDF) is calculated from the equation:

$$PDF = \frac{C1}{RV} + (C2*A)$$

where RV is a rank value of said multimedia program and C1 is a coefficient of a reciprocal of said rank value, and where A is an age of the program, and where C2 is a coefficient of said age of said multimedia program.

40. The method as claimed in claim 31 further comprising the step of:
calculating a rank value for each multimedia program identified by said exclusive metadata search using:
a search field weight factor for each search field; and
a number of matches of words found during said exclusive metadata search.

41. The method as claimed in claim 40 further comprising the step of:
creating a search result list of multimedia programs identified during said exclusive metadata search where said multimedia programs are listed in accordance with their respective rank values.

42. The method as claimed in claim 41 further comprising the step of:
automatically updating a priority of a multimedia program that is to be recorded by a multimedia recorder using a rank value of a multimedia program identified during said exclusive metadata search.

43. The method as claimed in claim 42 further comprising the step of:
using said multimedia search controller to delete a multimedia program from a program list based on a value of a program deletion factor calculated using a rank value of said multimedia program.

44. The method as claimed in claim 43 wherein said program deletion factor (PDF) is calculated from the equation:

$$PDF = \frac{C1}{RV} + (C2*A)$$

where RV is a rank value of said multimedia program and C1 is a coefficient of a reciprocal of said rank value, and where A is an age of the program, and where C2 is a coefficient of said age of said multimedia program.

45. Computer executable instructions stored on a computer readable storage medium for identifying a multimedia program that contains at least one word that is related to a user specified search word, the computer executable instructions comprising the steps of:
receiving in a metadata search controller metadata that contains words present in said multimedia program; and
executing in said metadata search controller an inclusive metadata search; and
identifying a match between said user specified search word and a metadata word of said multimedia program that is related to said user specified search word.

46. The computer executable instructions stored on a computer readable storage medium as claimed in claim 45 further comprising the steps of:
creating a word pair database in said metadata search controller, said word pair database containing a plurality of word pairs wherein each word pair in said word pair database comprises a first word and a second word; and
assigning a word pair weight factor to each word pair in said word pair database, said word pair weight factor indicating a relative significance of a relationship between said first word and said second word of said word pair.

47. The computer executable instructions stored on a computer readable storage medium as claimed in claim 46 further comprising the steps of:
executing in said metadata search controller an inclusive metadata search; and
identifying at least one word pair in said word pair database wherein one word of said word pair matches a metadata word of said multimedia program and wherein another word of said word pair matches said user specified search word.

48. The computer executable instructions stored on a computer readable storage medium as claimed in claim 47 further comprising the step of:
assigning a search field weight factor to each of a plurality of search fields in said inclusive metadata search wherein said search field weight factor is a number that reflects a relative importance of a search field.

49. The computer executable instructions stored on a computer readable storage medium as claimed in claim 48 further comprising the step of:
receiving in said metadata search controller a search field weight factor from one of: (1) a user instruction and (2) information concerning user viewing habits.

50. The computer executable instructions stored on a computer readable storage medium as claimed in claim 47 further comprising the step of:
assigning a word pair weight factor to at least one word pair in said word pair database using said metadata search controller.

51. The computer executable instructions stored on a computer readable storage medium as claimed in claim 50 further comprising the step of:
receiving in said metadata search controller a word pair weight factor from one of: (1) a user instruction and (2) information concerning user viewing habits.

52. The computer executable instructions stored on a computer readable storage medium as claimed in claim 51 further comprising the steps of:
receiving in said metadata search controller an inclusive search request comprising a plurality of search fields where a relationship between a first search field and a second search field is expressed by one of: logical operator AND, logical operator OR, logical operator NOT, and a logical operator comprising a combination of said logical operators AND, OR, and NOT.

53. The computer executable instructions stored on a computer readable storage medium as claimed in claim 45 further comprising the steps of:
executing in said metadata search controller an exclusive metadata search; and
identifying a match between said user specified search word and a metadata word of said multimedia program that exactly matches said user specified search word.

54. The computer executable instructions stored on a computer readable storage medium as claimed in claim 53 further comprising the step of:

receiving a user instruction in said metadata search controller to execute one of: an inclusive metadata search and an exclusive metadata search.

55. The computer executable instructions stored on a computer readable storage medium as claimed in claim 53 further comprising the step of:

receiving in said metadata search controller an exclusive search request comprising a plurality of search fields where a relationship between a first search field and a second search field is expressed by one of: logical operator AND, logical operator OR, logical operator NOT, and a logical operator derived from a combination of said logical operators AND, OR, and NOT.

56. The computer executable instructions stored on a computer readable storage medium as claimed in claim 48 further comprising the steps of:

calculating a rank value for each multimedia program identified by said inclusive metadata search using:

a search field weight factor for each search field;

a word pair weight factor for each word pair detected during said inclusive metadata search; and a number of matches of words found during said inclusive metadata search.

57. The computer executable instructions stored on a computer readable storage medium as claimed in claim 56 further comprising the step of:

calculating said rank value for each multimedia program identified by said inclusive metadata search with the equation:

$$Rank = \sum_{i=1}^{N} w_i \sum_{j=1}^{M} r_j$$

where N is a total number of words in a search field, and where $w_i$ is a search field weight factor for field "i", and where M is a total number of words within a field, and where $r_j$ is a matching factor for a "$j^{th}$" word in a particular field, and where if a match is exact, then a value of $r_j$ is equal to one (1).

58. The computer executable instructions stored on a computer readable storage medium as claimed in claim 56 further comprising the step of:

creating a search result list of multimedia programs identified during said inclusive metadata search where said multimedia programs are listed in accordance with their respective rank values.

59. The computer executable instructions stored on a computer readable storage medium as claimed in claim 58 further comprising the step of:

automatically updating a priority of a multimedia program that is to be recorded by a multimedia recorder using a rank value of a multimedia program identified during said inclusive metadata search.

60. The computer executable instructions stored on a computer readable storage medium as claimed in claim 59 further comprising the step of:

using said metadata search controller to delete a multimedia program from a program list based on a value of a program deletion factor calculated using a rank value of said multimedia program.

61. The computer executable instructions stored on a computer readable storage medium as claimed in claim 60 wherein said program deletion factor (PDF) is calculated from the equation:

$$PDF = \frac{C1}{RV} + (C2 * A)$$

where RV is a rank value of said multimedia program and C1 is a coefficient of a reciprocal of said rank value, and where A is an age of the program, and where C2 is a coefficient of said age of said multimedia program.

62. The computer executable instructions stored on a computer readable storage medium as claimed in claim 53 further comprising the step of:

calculating a rank value for each multimedia program identified by said exclusive metadata search using:

a search field weight factor for each search field; and a number of matches of words found during said exclusive metadata search.

63. The computer executable instructions stored on a computer readable storage medium as claimed in claim 62 further comprising the step of:

creating a search result list of multimedia programs identified during said exclusive metadata search where said multimedia programs are listed in accordance with their respective rank values.

64. The computer executable instructions stored on a computer readable storage medium as claimed in claim 63 further comprising the step of:

automatically updating a priority of a multimedia program that is to be recorded by a multimedia recorder using a rank value of a multimedia program identified during said exclusive metadata search.

65. The computer executable instructions stored on a computer readable storage medium as claimed in claim 64 further comprising the step of:

using said multimedia search controller to delete a multimedia program from a program list based on a value of a program deletion factor calculated using a rank value of said multimedia program.

66. The computer executable instructions stored on a computer readable storage medium as claimed in claim 65 wherein said program deletion factor (PDF) is calculated from the equation:

$$PDF = \frac{C1}{RV} + (C2 * A)$$

where RV is a rank value of said multimedia program and C1 is a coefficient of a reciprocal of said rank value, and where A is an age of the program, and where C2 is a coefficient of said age of said multimedia program.

* * * * *